9672X

A. S. Darley,

Oscillating Steam Engine.

Patented May 23, 1836.

N. PETERS, PHOTO-LITHOGRAPHER, WASHINGTON, D. C.

9672X

May 23. 1836

1. 2.

Augustus D. Dawley of Boston Massachusetts

Letters Patent

Figure 1:
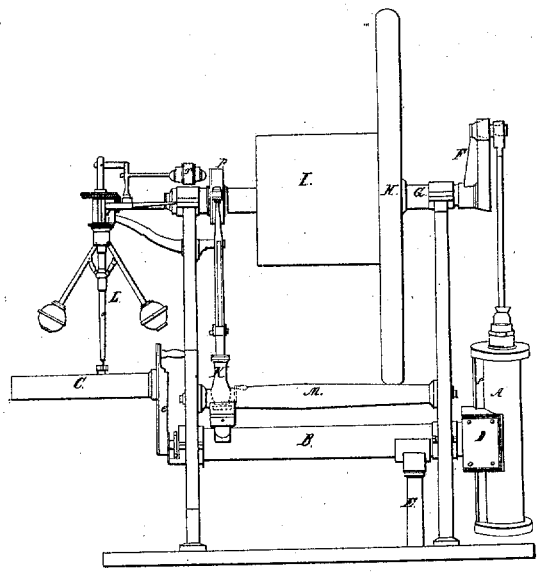
Figure 2:
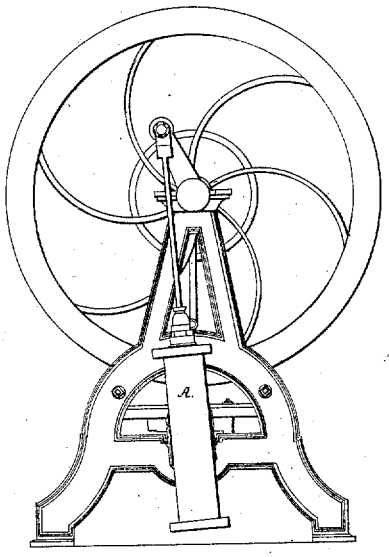
Figure 1:
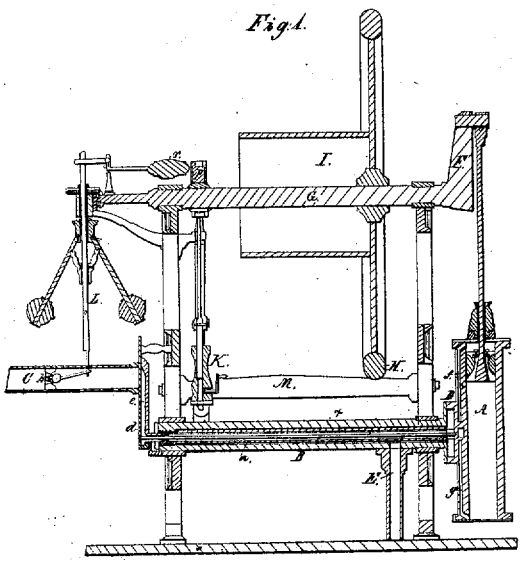
Figure 2:
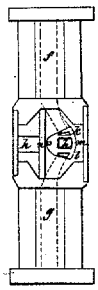
Figure 3:
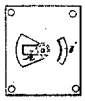

The schedule referred to in these Letters Patent and making part of
the same containing a description in the words of the said August D.
Dawley himself of his improvement in the Steam Engine, To all persons to whom these presents shall come Augustus D.
Dawley of Boston in the County of Suffolk and State of Massachu-
setts machinist sends Greeting. Be it known that I the said Au-
gustus D. Dawley have invented constructed and applied to use new
and useful improvements in the Steam Engine which improvement
the principle thereof, and mode in which I have contemplated the
application together with the manner of using the same I have hereunto
set forth and described as follows. Plates 1 & 2 represent different
views of my improved Steam Engine. Fig 1, being a side elevation show-
ing the several parts as they are arranged and combined together
or connected with the frame. Fig 2. is an end elevation exhibit-
ing the form and shape of the frame together with the cylinder while
vibrating on its shaft or axis. The main part of my improvements and
what I consider as new is affixing the steam cylinder A on the
end of a long hollow shaft or mandrel B. supported in bearings
near its extremities as seen in the drawings while other vibrating cylinders
have generally been hung on two short journals or arms projecting
from the opposite sides of the circumference, and resting and moving
in bearings connected to the frame work of the Engine, in which case
the steam has usually entered through one arm, and departed through
the other, or has been otherwise properly constructed to ensure the neces-
sary movement of the Engines. The operation of the Engine may be described
thus. The steam cock in the induction pipe C being turned gives ad-
mission to the steam from the boiler, which passing through the openings
of the throttle valve b rushes downwards into the pipe d (leading from
the box c and situated in the hollow mandrel or shaft B) and thence
into the steam valve chest D. From the valve chest it passes through the pipe f into the cylinder where it acts on the piston and forces it down
wards. In the mean time a communication is opened by the valve
passing by the slot or opening l. so that the steam or air under
the piston escapes through the pipe g under the valve into the open
ing h. Thence through the slot I into the mandrel (B from whence
it escapes through the eduction pipe C.) The construction of the valve
and apertures k. l. m. are more clearly shown in Figs 2 & 3
(Plate 2.) the valve being stationary and attached to the end of a [illegible]
rod x the other end of which is secured to the lower part of the steam
Box c. The Steam Chest is divided by a partition n. into two
apartments, one for the reception of steam from the Boiler, the other for
it after leaving the cylinder. The head of the piston Rod is imme
diately connected to the crank R on the main shaft G. H is the
fly wheel, I a pulley or drum for communicating power to any ma
chinery to which the Engine may be attached, p is the eccentric a[illegible]
ing the plunger of the force pump K. L is the governor operated upon
by a bevelled pinion on the end of the main shaft connected with a
bevelled wheel on the upright shaft o. M, M. are iron ties with [illegible]
dies screws and nuts for connecting the ends of the frame together. r
counterpoise of the governor. The remainder of the machinery is con
structed as represented in the drawings and may be otherwise form
ed or arranged if necessary.

In conclusion what I claim as my invention and improvement [illegible]
the combination of the several parts together as described and exhibit
ed in the ... annexed drawings. and separately I claim connecting
a steam cylinder to the end of a long mandrel or shaft to vibrate
back and forth and operate as I have herein mentioned. In te
stimony that the above is a true specification of my said invention a[nd]
improvements I have hereunto set my hand this nineteenth day
of March in the year of our Lord Eighteen hundred & thirty six.

Exd. Witnesses
[illegible] V. H. Eddy
J. W. Adams

Augustus S. Dawley